H. M. PFLAGER.
SIX WHEEL CAR TRUCK.
APPLICATION FILED FEB. 5, 1920.
1,381,497.
Patented June 14, 1921.
2 SHEETS—SHEET 1.
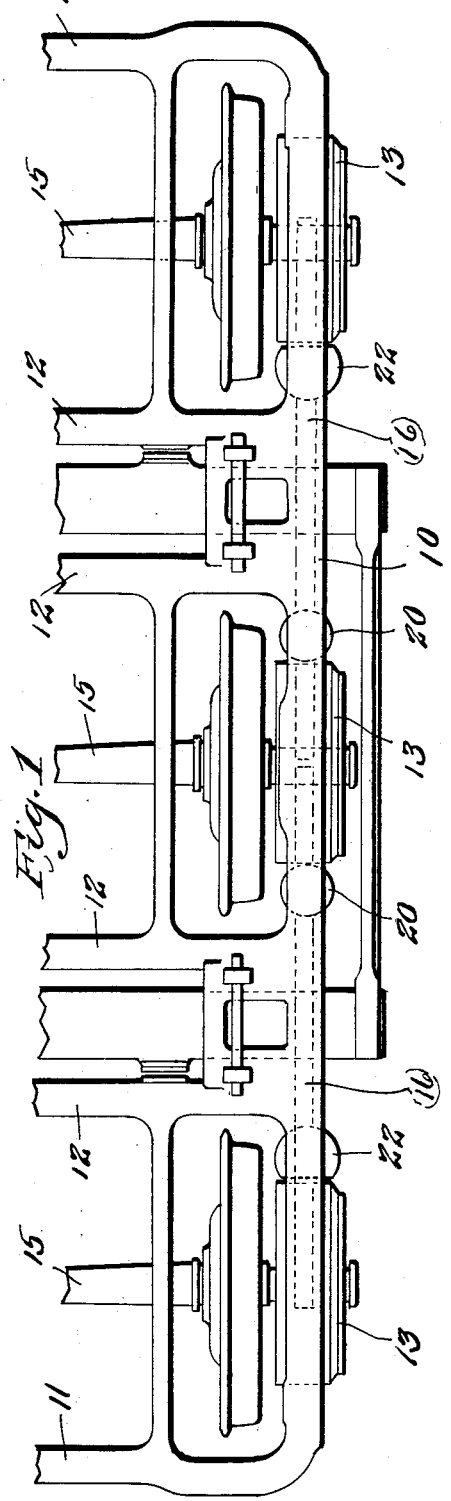
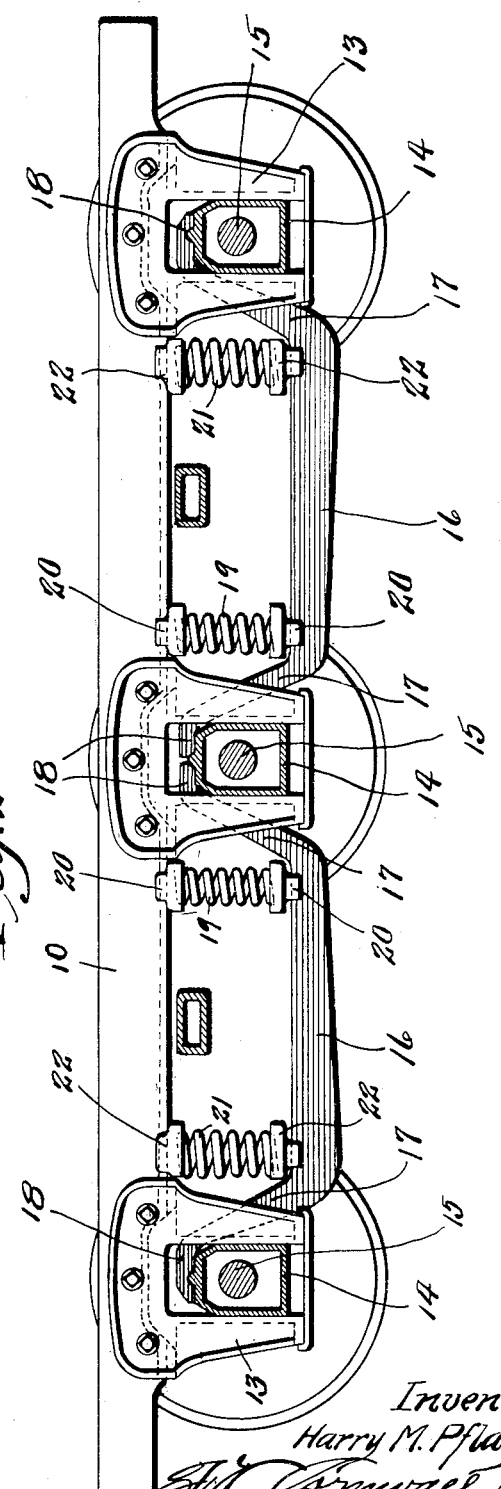
Inventor
Harry M. Pflager

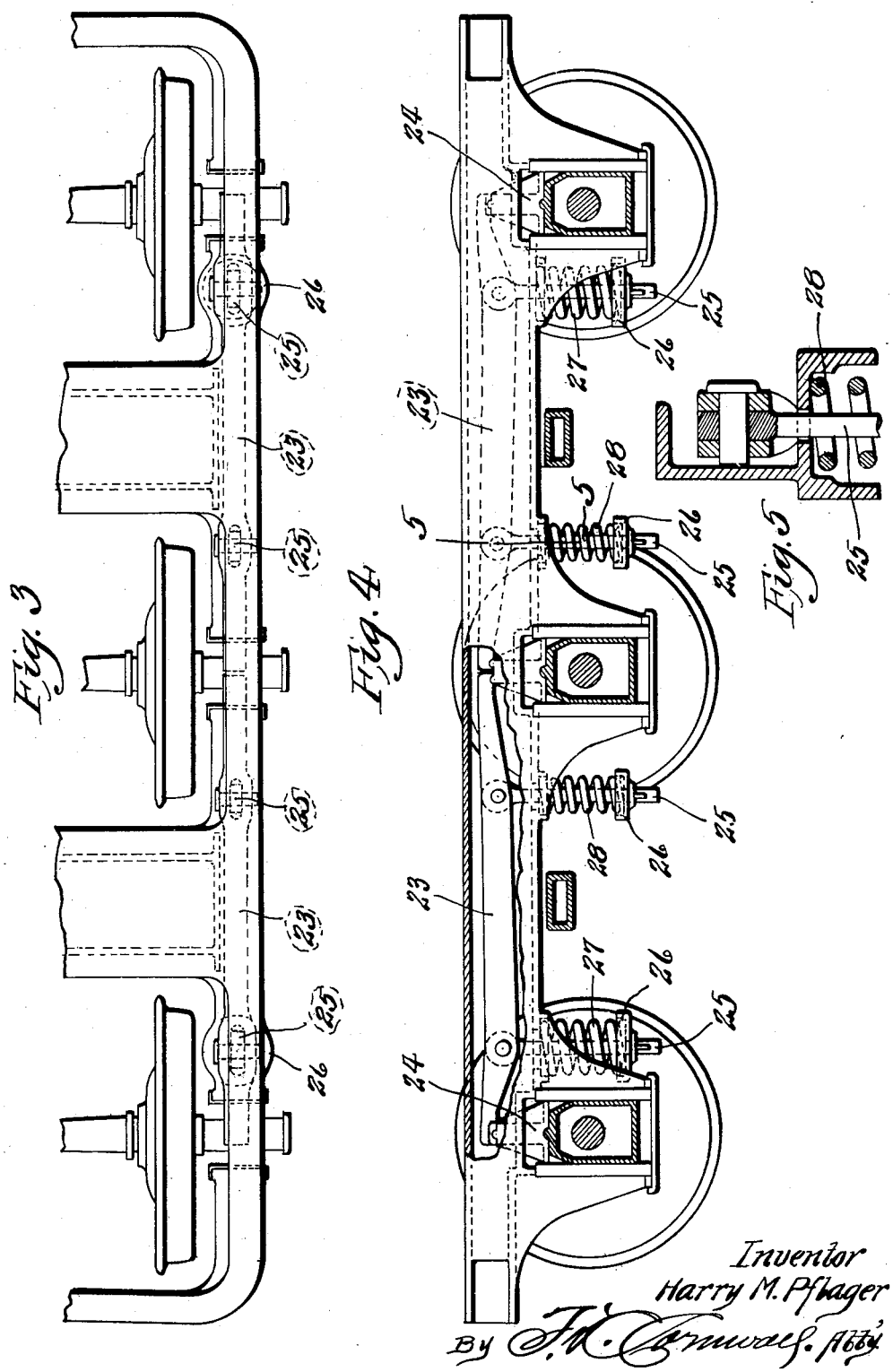

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL CAR-TRUCK.

1,381,497.   Specification of Letters Patent.   Patented June 14, 1921.

Application filed February 5, 1920. Serial No. 356,545.

*To all whom it may concern:*

Be it known that I, HARRY M. PFLAGER, a citizen of the United States, residing at St. Louis, Missouri, have invented a certain new and useful Improvement in Six-Wheel Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to a new and improved spring equalizer arrangement for six wheel trucks, and which arrangement is particularly designed for yieldingly supporting the truck frame upon the journal boxes of the truck.

In six wheel trucks, it is essential that the weight imposed on the journals of the axles through the truck frame be distributed equally between the three journals on each side of the truck, and in order to accomplish this, it has heretofore been customary to place a single spring on each equalizer, said spring being located at a point approximately two-thirds of the distance away from the middle axle toward each end axle so that two-thirds of the load imposed on each spring will be transmitted to each end axle, and the other one-third to the middle axle, thus equally distributing the weight of the load.

With this customary construction, due to the size of the wheels used, the excessively large spring required to carry the load and its location one-third of distance inward toward middle axle, completely obscures some of the heads and shoes and other parts of the brake rigging and renders it very difficult to inspect, remove and replace these parts.

The principal object of my invention is to provide a construction which permits an unobstructed view of all brake heads, shoes, and adjacent parts and by utilizing a plurality of springs between the rigid equalizing member and the truck frame, I am able to position said springs within the outline of the wheels of the truck and thus in no wise obscure any of the brake parts.

Other objects of my invention are to generally improve the construction of the load distributing arrangements heretofore utilized in six-wheel trucks and to provide a reliable, simple and efficient arrangement including two springs of different load-carrying capacities, said springs coöperating with a substantially rigid equalizing member for effecting the proper distribution of the imposed weights upon the journals of the truck.

Further objects of my invention are to provide for the equal distribution and absorption of shocks and vibration, due to track irregularities and prevent such shocks and vibrations from being distributed to the car body, thereby making the riding movement of said body more easy and gentle.

With the foregoing and other objects in view, my invention consists in certain novel features of construction and arrangement of parts, hereinafter more fully described and claimed, and illustrated in the accompanying drawings, in which—

Figure 1 is a plan view of the side portion of a six wheel truck frame that is equipped with my improved weight distributing and equalizing means.

Fig. 2 is a side elevational view of the truck constructed in accordance with my invention.

Fig. 3 is a plan view of the side portion of a six wheel truck equipped with a modified form of weight distributing and equalizing means.

Fig. 4 is a side elevational view of the truck equipped with the modified form of weight distributing means.

Fig. 5 is an enlarged cross section taken approximately on the line 5—5 of Fig. 4.

Referring by numerals to the accompanying drawings, and particularly to the construction illustrated in Figs. 1 and 2, 10 designates the wheel piece of an accepted type of six wheel truck frame, and which latter includes end pieces 11, and transom member 12. Rigidly fixed to and depending from the wheel pieces are pedestal jaws such as 13, between which are positioned the usual journal boxes 14, that contain the bearings for the ends of the wheel carrying axles 15.

Disposed between the middle journal box on each side of the truck frame and the end journal boxes are rigid equalizing members, each of which comprises a substantially straight middle portion 16, upwardly bent end portions 17, and horizontally disposed terminal portions 18, the latter bearing on top of the journal boxes 14. These equalizers occupy positions directly below the wheel pieces 10 of the truck frame, and in order to accommodate the upwardly projecting end portions 17, the pedestal jaws 13 are necessarily bifurcated or provided for a certain distance with vertically disposed slots.

Interposed between the inner ends of the straight portions 16 of the equalizers and the wheel pieces 10 of the truck frame are springs 19, the ends thereof bearing against suitable spring seats or plates 20 that are arranged on said wheel pieces and equalizers, and arranged between the outer portions of the straight equalizers and the wheel pieces 10 are springs 21, the ends of which bear upon suitable spring seats or plates 22. The springs 21 are relatively heavier and therefore have greater capacity than the springs 19, the proportions being such that two-thirds of the weight of the loads imposed by the truck frame on the two springs associated with each equalizer will be transmitted to the outer axle and one-third to the middle axle. As a result of this arrangement, the weight of the load carried by the truck frame is distributed equally between the three journals on each side of the truck, and consequently distributed equally between all of the journals.

Inasmuch as the springs 19 and 21 are located adjacent to the pedestals 13 and practically inside the circumferences of the adjacent wheels, said springs in no wise obstruct the free inspection, removal and replacement of the brake heads, brake shoes, and other parts of the brake rigging associated with the truck.

In Figs. 3, 4 and 5 I have disclosed a modified arrangement of the equalizing members and springs, and which modified construction involves the use of substantially straight rigid equalizing members 23, the same being disposed within the substantially hollow wheel pieces of the truck frame with their ends bearing upon the journal boxes or upon blocks 24 which rest upon and project upwardly from said journal boxes. Depending from these equalizing members and extending downward through suitable openings formed in the lower wall of the wheel piece are hangers 25, the same being located adjacent to the pedestals, and the lower ends of said hangers carrying spring supporting plates 26.

Interposed between the outer pair of these plates and the wheel piece of the truck frame are relatively heavy springs 27, and interposed between the inner pair of plates 26 and the wheel piece are lighter springs 28. In this modified arrangement, the results achieved by the construction heretofore described, namely, the equal distribution of the weight of the loads imposed upon the truck frame between the journals of the truck, is the same and likewise the springs associated with the equalizing members are positioned so as to permit free access to the outer parts of the brake rigging associated with the truck.

The load distributing arrangement contemplated by my invention is comparatively simple, can be easily and cheaply manufactured, materially increases the flexibility of the truck, and is very effective in performing its intended functions.

It will be readily understood that minor changes in the size, form and construction of the various parts of my improved six wheel car truck can be made and substituted for those herein shown and described, without departing from the spirit of my invention, the scope of which is set forth in the appended claims.

I claim:

1. A flexible support for railway car trucks comprising substantially rigid equalizing members supported upon the journal boxes associated with the truck, and a pair of springs interposed between each equalizing member and the truck frame, one spring of each pair being located between the centers of said equalizing members and the ends thereof, said springs having different load carrying capacities.

2. A flexible support for railway car trucks comprising substantially rigid equalizing members supported upon the journal boxes associated with the truck, and a pair of springs interposed between each equalizing member and the truck frame, one spring of each pair being located between the centers of said equalizing members and the ends thereof, one of said springs having greater carrying capacity than the other.

3. A flexible support for railway car trucks comprising substantially rigid equalizing members supported upon the journal boxes associated with the truck, and a plurality of truck supporting springs of different load carrying capacities associated with each equalizing member, there being a spring on each side of the center of said equalizing members.

4. A flexible support for railway car trucks comprising a plurality of pairs of springs, the members of each pair having different load carrying capacities, and a substantially rigid equalizing member associated with each pair of springs and said equalizing members and springs being arranged between the truck frame and the journal boxes associated therewith, one spring of each pair being located between the centers of said equalizing members and the ends thereof.

5. In a six wheel car truck, the combination with the truck frame and the journal boxes associated therewith, of means for equally distributing the weight of loads imposed upon the truck frame between the journals in said journal boxes, said means comprising substantially rigid equalizing members supported by the journal boxes, and a pair of springs arranged between each equalizing member and the truck frame, said springs having different load carrying capacities, one spring of each pair being located between the centers of said equalizing members and the ends thereof.

6. In a six wheel car truck, the combination with the truck frame and the journal boxes associated therewith, of means for equally distributing the weight of loads imposed upon the truck frame between the journals in said journal boxes, said means comprising substantially rigid equalizing members supported by the journal boxes, and a pair of springs arranged between each equalizing member and the truck frame, one spring of each pair having greater load carrying capacity than the other, one spring of each pair being located between the centers of said equalizing members and the ends thereof.

7. In a six wheel car truck, the combination with the truck frame and the journal boxes associated therewith, of means for equally distributing the weight of loads imposed upon the truck frame between the journals in said journal boxes, said means comprising substantially rigid equalizing members supported by the journal boxes, a spring interposed between each equalizing member and the truck frame and located adjacent to the center journal box, and a spring interposed between each equalizing member and the truck frame and located adjacent to the outer journal box, said last mentioned spring having greater load carrying capacity than the spring adjacent to the center journal box.

8. In a six wheel car truck, the combination with the truck frame and the journal boxes associated therewith, of means for equally distributing the weight of loads imposed upon the truck frame between the journals in said journal boxes, said means comprising substantially rigid equalizing members supported by the journal boxes, and springs interposed between the center and the end portions of each equalizing member and the truck frame, said springs having different load carrying capacities.

9. In a six wheel car truck, the combination with the truck frame and the journal boxes associated therewith, of means for equally distributing the weight of loads imposed upon the truck frame between the journals in said journal boxes, said means comprising substantially rigid equalizing members supported by the journal boxes, and springs interposed between the end portions and the center of each equalizing member and the truck frame, one of which springs has a greater load carrying capacity than the other.

10. In a six wheel car truck, the combination with the truck frame and the journal boxes associated therewith, of means for equally distributing the weight of loads imposed upon the truck frame between the journals in said journal boxes, said means comprising substantially rigid equalizing members supported by the journal boxes, relatively light springs interposed between the center and the inner portions of said equalizing members and the truck frame, and heavier springs interposed between the center and the outer portions of said equalizing members and the truck frame.

11. A flexible support for six-wheel railway car trucks comprising substantially rigid equalizing members supported directly by the journal boxes associated with the truck, and a pair of springs interposed between each equalizing member and the truck frame, said springs being located adjacent to the axles and lying substantially within the outline of the wheels so as to present an unobstructed view of and to give access to the brake heads, brake shoes, and adjacent parts of the brake rigging.

12. A flexible support for railway car trucks comprising substantially rigid equalizing members supported upon the journal boxes associated with the truck, and a pair of springs interposed between each equalizing member and the truck frame, said springs being located adjacent to the axles and lying substantially within the outline of the wheels so as to present an unobstructed view of and to give access to the brake heads, brake shoes, and adjacent parts of the brake rigging.

13. A flexible support for railway car trucks comprising substantially rigid equalizing members supported upon the journal boxes associated with the truck, and a plurality of truck supporting springs associated with each equalizing member, said springs being located adjacent to the axles and lying substantially within the outline of the wheels so as to present an unobstructed view of and to give access to the brake heads, brake shoes, and adjacent parts of the brake rigging.

14. A flexible support for railway car trucks comprising a plurality of pairs of springs, and a substantially rigid equalizing member associated with each pair of springs, said equalizing members and springs being arranged between the truck frame and the journal boxes associated therewith, said springs being located adjacent to the axles and lying substantially within the outline of the wheels so as to present an unobstructed view of and to give access to the brake heads, brake shoes, and adjacent parts of the brake rigging.

In testimony whereof I hereunto affix my signature this 30th day of January, 1920.

H. M. PFLAGER.